United States Patent
Sakaguchi et al.

(10) Patent No.: US 9,350,011 B2
(45) Date of Patent: May 24, 2016

(54) SECONDARY BATTERY NEGATIVE ELECTRODE MATERIAL, SECONDARY BATTERY NEGATIVE ELECTRODE, METHOD FOR MANUFACTURING SECONDARY BATTERY NEGATIVE ELECTRODE MATERIAL, AND METHOD FOR MANUFACTURING SECONDARY BATTERY NEGATIVE ELECTRODE

(71) Applicants: NEOMAX MATERIALS CO., LTD., Suita-shi, Osaka (JP); TOTTORI UNIVERSITY, Tottori-shi, Tottori (JP)

(72) Inventors: Hiroki Sakaguchi, Tottori (JP); Hiroyuki Usui, Tottori (JP); Ryouji Inoue, Suita (JP); Setsuo Andoh, Izumi (JP); Ken Asada, Izumi (JP)

(73) Assignees: HITACHI METALS, LTD., Tokyo (JP); TOTTORI UNIVERSITY, Tottoti (JP)

( * ) Notice: Subject to any disclaimer, the term of this patent is extended or adjusted under 35 U.S.C. 154(b) by 182 days.

(21) Appl. No.: 13/903,738

(22) Filed: May 28, 2013

(65) Prior Publication Data

US 2013/0252094 A1 Sep. 26, 2013

Related U.S. Application Data

(63) Continuation of application No. PCT/JP2010/071292, filed on Nov. 29, 2010.

(51) Int. Cl.
*H01M 4/134* (2010.01)
*H01M 4/1395* (2010.01)
(Continued)

(52) U.S. Cl.
CPC ............ *H01M 4/134* (2013.01); *H01M 4/1395* (2013.01); *H01M 4/366* (2013.01); *H01M 4/38* (2013.01); *Y02E 60/122* (2013.01); *Y02P 70/54* (2015.11)

(58) Field of Classification Search
CPC ..... H01M 4/134; H01M 4/1395; H01M 4/38; H01M 4/366
See application file for complete search history.

(56) References Cited

U.S. PATENT DOCUMENTS

| | | |
|---|---|---|
| 6,235,427 B1 | 5/2001 | Idota et al. |
| 6,899,918 B2 | 5/2005 | Yagi et al. |
| 2004/0219432 A1 | 11/2004 | Kojima et al. |

(Continued)

FOREIGN PATENT DOCUMENTS

| | | |
|---|---|---|
| JP | 2000-036323 A | 2/2000 |
| JP | 2004-319457 A | 11/2004 |

(Continued)

OTHER PUBLICATIONS

Chinese Office Action dated Feb. 4, 2015, issued in corresponding CN Patent Application No. 201080070412.2 with English translation (27 pages).

(Continued)

*Primary Examiner* — Muhammad Siddiquee
(74) *Attorney, Agent, or Firm* — Westerman, Hattori, Daniels & Adrian, LLP (57) ABSTRACT

This secondary battery negative electrode material constitutes an active material layer formed on a current collector layer of a secondary battery negative electrode and includes a Si particle and a coating material containing Ni and P, formed to cover a surface of the Si particle.

25 Claims, 6 Drawing Sheets

(51) Int. Cl.
*H01M 4/36* (2006.01)
*H01M 4/38* (2006.01)

(56) References Cited

U.S. PATENT DOCUMENTS

| | | | |
|---|---|---|---|
| 2005/0208379 A1 | 9/2005 | Musha et al. | |
| 2006/0051675 A1 | 3/2006 | Musha et al. | |
| 2006/0115735 A1* | 6/2006 | Yasuda et al. | 429/233 |
| 2010/0136437 A1* | 6/2010 | Nishida et al. | 429/330 |
| 2012/0121978 A1* | 5/2012 | Okada et al. | 429/209 |

FOREIGN PATENT DOCUMENTS

| | | | |
|---|---|---|---|
| JP | 2005-063767 A | 3/2005 |
| JP | 2005-340028 A | 12/2005 |
| JP | 2007-027102 A | 2/2007 |
| JP | 2003-217576 A | 7/2007 |
| JP | 2008-066279 A | 3/2008 |
| JP | 2008-305608 A | 12/2008 |
| WO | 2007/046327 A | 4/2007 |

OTHER PUBLICATIONS

Japanese Office Action dated Sep. 9, 2014, issued in corresponding Japanese Application No. 2012-546595; w/ English Translation. (10 pages).

International Search Report for PCT/JP2010/071292, Mailing Date of Feb. 1, 2011.

Hiroyuki Usui et al. "Anode Properties of Thick-Film Electrodes Prepared by Gas Deposition of Ni-Coated Si Particles" Journal of Power Souces (2008), pp. 1-24.

Masafumi Shibata et al. of Department of Chemistry and Biotechnology, Graduate School of Engineering, Tottori University, "Anode Behaviors of Ni-coated Si Composite Thick Film Electrodes", Extended Abstracts of the 50th Battery Symposium in Japan, The Committee of Battery Technology, The Electrochemical Society of Japan, Nov. 30, 2009, pp. 67.

Korean Office Action dated Dec. 10, 2015, issued in counterpart Korean Patent Application No. 10-2013-7012757, with English translation. (11 pages).

* cited by examiner

|  | Si | Ni | Sn | P |
|---|---|---|---|---|
| EXAMPLE | 99.8 | 0.18 | — | 0.02 |
| COMPARATIVE EXAMPLE 1 | 90 | 10 | — | — |
| COMPARATIVE EXAMPLE 2 | 92 | 7 | 1 | — |
| COMPARATIVE EXAMPLE 3 | 100 | — | — | — |

(MASS %)

FIG.3

| LATTICE PLANE OF Ni-P (hkl) | LATTICE SPACING OF Ni-P (nm) | |
|---|---|---|
|  | THEORETICAL VALUE OF $Ni_3P$ | ACTUAL MEASUREMENT VALUE OF Ni-P |
| (211) | 0.296 | 0.297 |
| (400) | 0.224 | 0.225 |
| (222) | 0.180 | 0.181 |
| (402) | 0.156 | 0.157 |
| (460) | 0.124 | 0.124 |

Ar GAS + SECONDARY BATTERY NEGATIVE ELECTRODE MATERIAL

|  |  | EXAMPLE (Ni-P COATED Si) | COMPARATIVE EXAMPLE 1 (Ni COATED Si) | COMPARATIVE EXAMPLE 2 (Ni-Sn COATED Si) | COMPARATIVE EXAMPLE 3 (UNCOATED Si) |
|---|---|---|---|---|---|
| DISCHARGE CAPACITY ($10^{-3}$Ah/g) | FIRST TIME | 1590 | 750 | 950 | 2000 |
|  | 1000TH TIME | 750 | 600 | 150 | 30 |

SECONDARY BATTERY NEGATIVE ELECTRODE MATERIAL, SECONDARY BATTERY NEGATIVE ELECTRODE, METHOD FOR MANUFACTURING SECONDARY BATTERY NEGATIVE ELECTRODE MATERIAL, AND METHOD FOR MANUFACTURING SECONDARY BATTERY NEGATIVE ELECTRODE

CROSS-REFERENCE TO RELATED APPLICATIONS

This application is a continuation of PCT/JP2010/071292, Secondary Battery Negative Electrode Material, Secondary Battery Negative Electrode, Method for Manufacturing Secondary Battery Negative Electrode Material, and Method for Manufacturing Secondary Battery Negative Electrode, Nov. 29, 2010, Hiroki Sakaguchi, Hiroyuki Usui, Ryouji Inoue, Setsuo Andoh, and Ken Asada.

BACKGROUND OF THE INVENTION

1. Field of the Invention

The present invention relates to a secondary battery negative electrode material, a secondary battery negative electrode, a method for manufacturing a secondary battery negative electrode material, and a method for manufacturing a secondary battery negative electrode, and more particularly, it relates to a secondary battery negative electrode material constituting an active material layer and a method for manufacturing the same, and a secondary battery negative, electrode including an active material layer and a method for manufacturing the same.

2. Description of the Background Art

In recent years, Si having a large charge-discharge capacity has been regarded as a promising active material (secondary battery negative electrode material) of a secondary battery negative electrode, in order to increase the capacity of a lithium ion secondary battery. However, Si is known to significantly decrease the discharge capacity of the secondary battery negative electrode from an initial value (decrease the charge-discharge cycle, life) when the lithium ion secondary battery is repeatedly charged and discharged. The reason why Si decreases the charge-discharge cycle life is considered to be because the secondary battery negative electrode is disrupted by stress generated in the secondary battery negative electrode due to a difference between the volume of the secondary battery negative electrode during charging and the volume of the secondary battery negative electrode during discharging and partially becomes non-functional.

As one way to suppress decrease in the charge-discharge cycle life, it is proposed to employ an active material having Si particles whose surfaces are Ni-plated as an active material of a lithium ion secondary battery negative electrode. Such an active material including Si particles whose surfaces are Ni-plated is disclosed in Japanese Patent Laying-Open No. 2005-63767, for example.

In Japanese Patent Laying-Open No. 2005-63767, there are disclosed active material particles (secondary battery negative electrode material) constituting an active material layer of a secondary battery negative electrode and including Si particles and metal thin films of Ni plating formed to cover surfaces of the Si particles. In this manner, Ni plating is performed to cover the surfaces of the Si particles, whereby the Si particles can withstand stress generated in the secondary battery negative electrode, and disruption of the Si particles can be suppressed. Thus, decrease in the charge-discharge cycle life can be suppressed.

However, although the active material particles including the Ni-plated Si particles described in Japanese Patent Laying-Open No. 2005-63767 can be employed to increase the charge-discharge cycle life and improve, the charge-discharge capacity of the secondary battery negative electrode to some extent, in recent years, it has been desired to further improve the charge-discharge capacity while increasing the charge-discharge cycle life.

SUMMARY OF THE INVENTION

The present invention has been proposed in order to solve the aforementioned problem, and an object of the present invention is to provide a secondary battery negative electrode material capable of further improving the charge-discharge capacity of a secondary battery negative electrode while increasing the charge-discharge cycle life in a secondary battery and a method for manufacturing the same, and a secondary battery negative electrode and a method for manufacturing the same.

In order to attain the aforementioned object, as a result of deep studies, the inventors have found that a coating material containing Ni and P is formed to cover a surface of a. Si particle, whereby the charge-discharge capacity of a second battery negative electrode can be further improved while the charge-discharge cycle life, is increased in a secondary battery. In other words, a secondary battery negative electrode, material according to a first aspect of the present invention constitutes an active material layer formed on a current collector layer of a secondary battery negative electrode and includes a Si particle and a coating material containing Ni and P, formed to cover a surface of the Si particle.

In the secondary battery negative electrode material according to the first aspect of the present invention, as hereinabove described, the coating material containing Ni and P is formed to cover the surface, of the Si particle, whereby the charge-discharge capacity of the secondary battery negative, electrode can be improved while the charge-discharge cycle life of the secondary battery negative electrode can be further increased as compared with a case where the coating material includes only Ni. This point is evidenced by experimental results described later.

Preferably in the aforementioned secondary battery negative electrode material according to the first aspect, the coating material is formed to be distributed in an island-like, dot-like, or net-like pattern so as to partially cover the surface of the Si particle. According to this structure, insertion and desorption of an electrolyte of a secondary battery is facilitated, and hence the charge-discharge capacity of the secondary battery negative electrode can be further improved. This point is also evidenced by the experimental results described later.

Preferably in the aforementioned secondary battery negative electrode material according to the first aspect, the coating material covers at least 1% and not more than 25% of the surface of the Si particle. According to this structure, the coating material covers not more than 25% of the surface of the Si particle, whereby an area of contact between Si and the electrolyte of the secondary battery can be increased when the secondary battery negative electrode, material is employed in the active material layer of the secondary battery negative electrode. Thus, Si and the electrolyte of the secondary battery can sufficiently react, and hence the charge-discharge capacity (availability of Si) of the secondary battery negative electrode can be more effectively improved. Furthermore, the coating material covers at least 1% of the surface of the particle, whereby the coating material helps the Si particle to be capable of withstanding stress generated due to volume change in the secondary battery negative electrode, during charging and discharging, and disruption of the Si particle can be suppressed. Thus, the charge-discharge cycle life can be increased.

Preferably in the aforementioned secondary battery negative electrode material according to the first aspect, at least a part of the coating material containing Ni and P has a crystal structure of $Ni_3P$. According to this structure, when the secondary battery negative electrode material is employed in the active material layer of the secondary battery negative electrode, $Ni_3P$ included in the coating material help the Si particle to be capable of withstanding the stress generated due to the volume change in the secondary battery negative electrode during charging and discharging, and disruption of the Si particle can be suppressed. Thus, the charge-discharge cycle life can be increased.

Preferably in the aforementioned secondary battery negative electrode material according to the first aspect, the coating material includes P of at least 0.5 mass % and not more than 50 mass % and Ni. According to this structure, the crystal structure of Ni including P includes $Ni_3P$ so that the charge-discharge cycle life can be increased when the secondary battery negative electrode material including the coating material containing P of at least 0.5 mass % and not more than 50 mass % and Ni is employed in the active material layer of the secondary battery negative, electrode.

Preferably in this case, the coating material includes P of at least 5 mass % and not more than 16 mass % and Ni. According to this structure, the charge-discharge cycle life of the secondary battery negative electrode can be further improved when the secondary battery negative electrode material including the coating material containing P of at least 5 mass % and not more than 16 mass % and Ni is employed in the active material layer of the secondary battery negative electrode.

A secondary battery negative electrode according to a second aspect of the present invention includes a current collector layer and an active material layer formed on a surface of the current collector layer, while the active material layer includes a Si portion and a coating portion containing Ni and P, formed on the Si portion or between the Si portions.

In the aforementioned secondary battery negative electrode according to the second aspect of the present invention, as hereinabove described, the active material lever includes the Si portion and the coating portion containing Ni and P, formed on the Si portion or between the Si portions, whereby the charge-discharge capacity of the secondary battery negative electrode can be improved while the charge-discharge cycle life of the secondary battery negative, electrode can be further increased as compared with a case where the coating portion includes only Ni. This point is evidenced by the experimental results described later.

Preferably in the aforementioned secondary battery negative electrode, according to the second aspect, the coating portion is formed to be distributed in an island-like, dot-like, or net-like pattern on the Si portion or between the Si portions. According to this structure, the active material layer can withstand stress generated in the secondary battery negative electrode during charging and discharging, and disruption of the active material layer can be suppressed. In addition, insertion and desorption of an electrolyte of a secondary battery is facilitated, and hence the charge-discharge capacity of the secondary battery negative electrode can be further improved. This point is evidenced by the experimental results described later.

Preferably in the aforementioned secondary battery negative electrode according to the second aspect, a void is formed on the Si portion of the active material layer or between the Si portions of the active material layer. According this structure, the stress generated in the secondary battery negative electrode, during charging and discharging can be reduced by the void. Thus, the charge-discharge cycle life can be further increased.

Preferably in this case, the void is formed at a level of at least 20 volume % and not more than 70 volume % of the active material layer. According to this structure, the void is formed at the level of at least 20 volume % of the active material layer, whereby the void sufficient to reduce the stress can be obtained, and hence the stress generated in the secondary battery negative electrode during charging and discharging can be reduced. Furthermore, the void is formed at the level of not more than 70 volume % of the active material layer, whereby excessive reduction in the volume of the Si portion to react with the electrolyte of the secondary battery resulting from excessive increase in a proportion of the void can be suppressed. Thus, reduction in the charge-discharge capacity of the secondary battery negative electrode can be suppressed.

Preferably in the aforementioned secondary battery negative electrode according to the second aspect, the thickness of the active material layer is at least 1 µm and not more than 20 µm. According to this structure, the thickness of the active material layer is at least 1 µm, whereby reduction in the charge-discharge capacity of the secondary battery negative electrode, can be suppressed. Furthermore, the thickness of the active material layer is not more than 20 µm, whereby difficulty in reaction of Si in the vicinity of the current collector layer with the electrolyte of the secondary battery can be suppressed, and hence reduction in the charge-discharge rate of the secondary battery negative electrode due to difficulty in reaction of Si in the vicinity of the current collector layer with the electrolyte of the secondary battery can be suppressed.

Preferably in the aforementioned secondary battery negative electrode, according to the second aspect, the coating portion of the active material layer includes P of at least 0.5 mass % and not more than 50 mass % and According to this structure, the secondary battery negative electrode, includes the coating material including P of at least 0.5 mass % and not more than 50 mass % and Ni, whereby the crystal structure of Ni including P includes $Ni_3P$ so that the charge-discharge cycle life can be increased.

Preferably in the aforementioned secondary battery negative electrode according to the second aspect, the active material layer includes a Si layer and the coating portion containing Ni and P, formed to be distributed in the island-like, dot-like, or net-like pattern in the Si layer. According to this structure, the Si layer can easily come into contact with the electrolyte during charging and discharging, and hence, the charge-discharge capacity of the secondary battery negative electrode can be improved.

Preferably in the aforementioned secondary battery negative electrode according to the second aspect, the active material layer includes a plurality of Si particles and a coating material containing Ni and P, formed to be distributed in the island-like, dot-like, or net-like, pattern so as to partially cover surfaces of the Si particles. According to this structure, the plurality of Si particles can easily come into contact with the electrolyte during charging and discharging, and hence the charge-discharge capacity of the secondary battery negative electrode, can be improved.

A method for manufacturing a secondary battery negative electrode material according to a third aspect of the present invention includes steps of preparing a Si particle and distributing a coating material containing Ni and P to cover a surface of the Si particle.

As hereinabove described, the method for manufacturing a secondary battery negative electrode material according to the third aspect of the present invention includes the step of distributing the coating material containing Ni and P to cover the surface of the Si particle, whereby the charge-discharge capacity of the secondary battery negative electrode can be improved while the charge-discharge cycle life of a secondary battery negative electrode can be further increased as compared with a case where the coating material includes only Ni.

Preferably in the aforementioned method for manufacturing a secondary battery negative electrode, material according to the third aspect, the step of distributing the coating material includes a step of distributing the coating material in an island-like, dot-like, or net-like pattern to partially cover the surface of the Si particle. According to this structure, the coating material containing Ni and P is distributed in the island-like, dot-like, or net-like pattern to partially, but not totally, cover the surface of the Si particle, whereby insertion and desorption of an electrolyte of a secondary battery is facilitated, and hence the charge-discharge capacity of the secondary battery negative electrode can be further improved.

Preferably in the aforementioned method for manufacturing a secondary battery negative electrode material according to the third aspect, the step of distributing the coating material includes a step of distributing the coating material by performing plate processing. According to this structure, the coating material containing Ni and P can be easily distributed in the island-like, dot-like, or net-like pattern to partially cover the surface of the Si particle by plate processing.

Preferably in the aforementioned method for manufacturing a secondary battery negative electrode material according to the third aspect, the step of distributing the coating material includes a step of distributing the coating material so, as to cover at least 1% and not more than 25% of the surface of the Si particle. According to this structure, the coating material covers not more than 25% of the surface of the Si particle, whereby an area of contact between the Si portion and the electrolyte of the secondary battery can be increased when the secondary battery negative electrode material is employed in the active material layer of the secondary battery negative electrode. Thus, the Si portion and the electrolyte of the secondary battery can sufficiently react, and hence, the charge-discharge capacity (availability of Si) of the secondary battery negative electrode can be more effectively improved. Furthermore, the coating material covers at least 1% of the surface of the Si particle, whereby the coating material helps the Si particle to be capable of withstanding stress generated due to volume change in the secondary battery negative electrode during charging and discharging, and disruption of the Si particle, can be suppressed. Thus, the charge-discharge cycle life can be increased.

Preferably in the aforementioned method for manufacturing a secondary battery negative electrode material according to the third aspect, the step of distributing the coating material includes a step of distributing the coating material such that at least a part of the coating material containing Ni and P has a crystal structure of Ni$_3$P. According to this structure, when the secondary battery negative, electrode material is employed in the active material layer of the secondary battery negative electrode, Ni$_3$P included in the coating material helps the Si particle to be capable of withstanding the stress generated due to the volume change in the secondary battery negative electrode during charging and discharging, and disruption of the Si particle can be suppressed. Thus, the charge-discharge cycle life can be increased.

Preferably in the aforementioned method for manufacturing a secondary battery negative electrode material according to the third aspect, the coating material includes P of at least 0.5 mass % and not more than 50 mass % and Ni. According to this structure, the crystal structure of Ni including P includes Ni$_3$P so that the charge-discharge cycle life can be increased when the secondary battery negative electrode material including the coating material containing P of at least 0.5 mass % and not more than 50 mass % and Ni is employed in the active material layer of the secondary battery negative electrode.

A method for manufacturing a secondary battery negative electrode according to a fourth aspect of the present invention includes steps of preparing a Si particle, forming a powdery secondary battery negative electrode material by distributing a coating material containing Ni and P to cover a surface of the Si particle, and forming an active material layer including a. Si portion and a coating portion containing Ni and P on the Si portion or between the Si portions by arranging the powdery secondary battery negative electrode material on a surface of a current collector by a prescribed method.

As hereinabove described, the method for manufacturing a secondary battery negative electrode, according to the fourth aspect of the present invention includes the step of forming the active material layer including the Si portion and the coating portion containing Ni and P on the Si portion or between the Si portions by arranging the powdery secondary battery negative electrode material on the surface of the current collector, whereby the charge-discharge capacity of the secondary battery negative electrode can be improved while the charge-discharge cycle life, of the secondary battery negative electrode can be further increased as compared with a case where the coating portion includes only Ni.

Preferably in the aforementioned method for manufacturing a secondary battery negative electrode according to the fourth aspect, the step of forming the powdery secondary battery negative electrode material includes a step of distributing the coating material in an island-like, dot-like, or net-like pattern to partially cover the surface of the Si particle. According to this structure, insertion and desorption of an electrolyte of a secondary battery is facilitated, and hence the charge-discharge capacity of the secondary battery negative electrode can be further improved.

Preferably in this case, the step of forming the active material layer includes a step of forming the active material layer including the Si portion and the coating portion distributed in the island-like, dot-like, or net-like pattern on the Si portion or between the Si portions by arranging the powdery secondary battery negative electrode, material on the surface of the current collector. According to this structure, the active material layer can withstand stress generated in the secondary battery negative electrode during charging and discharging, and disruption of the active material layer can be suppressed. In addition, insertion and desorption of the electrolyte of the secondary battery is facilitated, and hence the charge-discharge capacity of the secondary battery negative electrode can be further improved.

Preferably in the aforementioned method for manufacturing a secondary battery negative electrode according to the fourth aspect, the step of forming the active material layer includes a step of forming the active material layer by spraying the powdery secondary battery negative electrode material on the surface of the current collector by an aerosol deposition method. According to this structure, the active material layer can be easily formed to include the Si layer and the coating portion containing Ni and P, formed to be distributed in the island-like, dot-like, or net-like pattern in the Si layer.

Preferably in the aforementioned method for manufacturing a secondary battery negative electrode according to the fourth aspect, the step of forming the active material layer includes a step of forming the active material layer by applying a coating liquid containing the powdery secondary battery negative electrode material onto the surface of the current collector. According to this structure, the active material layer can be easily formed to include a plurality of Si particles and the coating material containing Ni and P, formed to be distributed in the island-like, dot-like, or net-like pattern so as to partially cover surfaces of the Si particles.

Preferably in the aforementioned method for manufacturing a secondary battery negative electrode according to the fourth aspect, the step of forming the active material layer includes a step of forming the active material layer such that a void is formed on the Si portion of the active material layer or between the Si portions of the active material layer. According to this structure, the stress generated in the secondary battery negative electrode, during charging and discharging can be reduced by the void. Thus, the charge-discharge cycle life can be further increased.

Preferably in the aforementioned method for manufacturing a secondary battery negative electrode according to the fourth aspect, the step of forming the secondary battery negative electrode, material includes distributing the coating material such that the coating material includes P of at least 0.5 mass % and not more than 50 mass % and Ni, whereby the coating material includes P of at least 9.5 mass % and not more than 50 mass % and Ni, so that the crystal structure of Ni including P has $Ni_3P$. Thus, the charge-discharge, cycle life can be increased.

DESCRIPTION OF THE PREFERRED EMBODIMENTS

Embodiments embodying the present invention are hereinafter described on the basis of the drawings.

First Embodiment

The structure of a secondary battery negative electrode material 100 according to a first embodiment of the present invention is now described with reference to FIG. 1.

The secondary battery negative electrode material 100 according to the first embodiment of the present invention is a material constituting an active material layer 202 of a secondary battery negative electrode 200 described later and includes a Si particle 1 and a coating material 2 formed on a surface 1a of the Si particle 1. This Si particle 1 includes Si and has a particle diameter of at least about 0.01 μm and not more than about 20 μm.

According to the first embodiment, the coating material 2 is formed on the surface 1a of each of a plurality of Si particles 1 to partially cover the surface 1a and to be distributed in an island-like, dot-like, or net-like pattern. Furthermore, the coating material 2 is formed to cover at least about 1% and not more than about 25% of the area of the surface 1a of the Si particle 1. In other words, the coating material 2 is formed in a state where about at least 75% and not more than about 99% of the area of the surface 1a of the Si particle 1 is exposed.

According to the first embodiment, the coating material 2 partially includes Ni—P alloy having a crystal structure of $Ni_3P$. The composition of the entire coating material 2 includes P of at least about 0.5 mass % and not more than about 50 mass % and Ni. It is preferable that the composition of the entire coating material 2 include P of at least about 5 mass % and not more than about 16 mass % and Ni since a proportion of $Ni_3P$ in the coating material 2 can be increased.

A process for manufacturing the secondary battery negative electrode material 100 according to the first embodiment of the present invention is now described with reference to FIG. 1.

Figure 1:
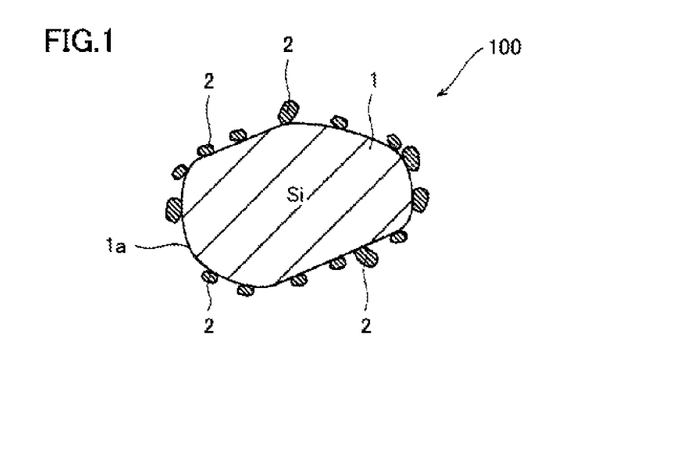
FIG. 1 is a sectional view showing the structure of a secondary battery negative electrode material according to a first embodiment of the present invention.

First, the Si particle 1 (Si powder) shown in FIG. 1 is prepared. This Si particle 1 includes Si and has a particle diameter of at least about 0.01 μm and not more than about 20 μm.

According to the first embodiment, the coating material 2 is formed on the surface 1a of each of the plurality of Si particles 1 to partially cover the surface 1a by an electroless deposition (ELD) method, which is a type of plate processing, and to be distributed in the island-like, dot-like, or net-like pattern. Specifically, the plurality of Si particles 1 (about 0.14 g of Si powder), about 0.05 g of $NaBH_4$, about 0.05 g of $NaH_2PO_2 \cdot H_2O$, and about 0.01 g of $Na_3C_6H_5O_7 \cdot 2H_2O$ are added to about 0.1 M of $H_2SO_4$ aqueous solution in which about 0.07 g of $NiSO_4.6H_2O$ is dissolved. Then, the prepared solution is agitated under a temperature condition of about 70° C., whereby electroless plating processing is performed. Thus, the coating material 2 is formed on the surface 1a of each of the plurality of Si particles 1 to partially cover the surface 1a and to be distributed in the island-like, dot-like, or net-like pattern, as shown in FIG. 1. Consequently, a plurality of secondary battery negative electrode materials 100 are formed.

According to the first embodiment, as hereinabove described, the coating material 2 including Ni and P is distributed in the island-like, dot-like, or net-like pattern to partially cover the surface 1a of the Si particle 1, whereby the charge-discharge cycle life of the secondary battery negative electrode 200 can be further increased as compared with a case where the coating material 2 includes only Ni. Furthermore, the coating material 2 including Ni and P is distributed in the island-like, dot-like, or net-like pattern to partially, but not totally, cover the surface 1a of the Si particle 1, whereby insertion and desorption of an electrolyte (Li cation) of a lithium ion secondary battery is facilitated, and hence the charge-discharge capacity of the secondary battery negative, electrode 200 can be improved.

According to the first embodiment, as hereinabove described, the coating material 2 covers not more than 25% of the surface 1a of the Si particle 1, whereby an area of contact between a Si layer 221 and the electrolyte (Li cation) of the lithium ion secondary battery can be increased when the secondary battery negative electrode materials 100 are employed in the active material layer 202 of the secondary battery negative electrode 200. Thus, Si and the Li cation can sufficiently react, and hence, the charge-discharge capacity (availability of Si) of the secondary battery negative electrode 200 can be more effectively improved. Furthermore, the coating material 2 covers at least 1% of the surface 1a of the Si particle 1, whereby the coating material 2 helps the Si particle 1 to be capable of withstanding stress generated due to volume change in the secondary battery negative electrode 200 during charging and discharging, and disruption of the Si particle 1 can be suppressed. Thus, the charge-discharge cycle life can be increased.

According to the first embodiment, as hereinabove described, the coating material 2 is configured to partially include the Ni—P alloy having the crystal structure of $Ni_3P$, whereby when the secondary battery negative electrode materials 100 are employed in the active material layer 202 of the secondary battery negative electrode 200, $Ni_3P$ included in the coating material 2 helps the Si particle 1 to be capable of withstanding the stress generated due to the volume change in the secondary battery negative electrode 200 during charging and discharging, and disruption of the Si particle 1 can be suppressed. Thus, the charge-discharge cycle life can be increased.

According to the first embodiment, as hereinabove described, the coating material 2 is so configured that the composition of the entire coating material 2 includes P of at least about 0.5 mass % and not more than about 50 mass % and Ni, whereby the crystal structure of Ni including P includes $Ni_3P$ so that the charge-discharge cycle life can be increased when the secondary battery negative electrode materials 100 including the coating material 2 containing P of at least 0.5 mass % and not more than 50 mass % and Ni are employed in the active material layer 202 of the secondary battery negative electrode 200.

According to the first embodiment, as hereinabove described, the coating material 2 is formed on the surface 1a of each of the plurality of Si particles 1 to partially cover the surface, 1a by the electroless deposition (ELD) method, which is a type of plate processing, and to be distributed in the island-like, dot-like, or net-like pattern, whereby the coating material 2 containing Ni and P can be easily distributed in the island-like, dot-like, or net-like pattern to partially cover the surface 1a of the Si particle 1 by the electroless deposition method.

Example 1

Composition measurement and lattice spacing measurement performed to confirm the composition of the secondary battery negative electrode material 100 according to the aforementioned first embodiment are now described with reference to FIGS. 1 to 3.

(Composition Measurement)

First, a coating material was formed on a surface of each of a plurality of Si particles including Si and each having a particle diameter of at least 0.01 μm and not more than 20 μm as described below by the electroless deposition (BID) method, whereby a plurality of secondary battery negative, electrode materials corresponding to an example and comparative examples 1 and 2 were prepared. In addition, as a comparative example 3, a secondary battery negative electrode material including a Si particle formed with no coating material was prepared. Then, the compositions of the plurality of secondary battery negative electrode materials corresponding to the example and the comparative examples 1 and 2 were measured.

Specifically, as the example corresponding to the aforementioned first embodiment, the plurality of Si particles 1 (0.140 g of Si powder), 0.050 g of $NaBH_4$, 0.049 g of $NaH_2PO_2.H_2O$, and 0.014 g of $Na_3C_6H_5O_7.2H_2O$ were added to 0.1 M of $H_2SO_4$ aqueous solution in which 0.070 g of $NiSO_4.6H_2O$ was dissolved. Then, the prepared solution was agitated under a temperature condition of 70° C., whereby the coating material partially covering the surface 1a and distributed in the island-like, dot-like, or net-like pattern was formed on the surface 1a of each of the plurality of Si particles 1. Thus, the plurality of secondary battery negative electrode materials 100 (see FIG. 1) corresponding to the example were prepared.

As the comparative example 1, a plurality of Si particles (0.125 g of Si powder) and 0.500 g of $NaBH_4$ were added to 0.1 M of $H_2SO_4$ aqueous solution in which 0.063 g of $NiSO_4.6H_2O$ was dissolved. Then, the prepared solution was agitated at room temperature, whereby a coating material including Ni was formed on a surface of each of the plurality of Si particles. Thus, the secondary battery negative electrode material corresponding to the comparative example 1 was prepared.

As the comparative example 2, a plurality of Si particles (0.140 g of Si powder), 0.500 g of $NaBH_4$, and 0.002 g of $SnSO_4$ were added to 0.1 M of $H_2SO_4$ aqueous solution in which 0.070 g of $NiSO_4.6H_2O$ was dissolved. Then, the prepared solution was agitated at room temperature, whereby a coating material including Ni—Sn alloy was formed on a surface of each of the plurality of Si particles. Thus, the secondary battery negative electrode material corresponding to the comparative example 2 was prepared.

Then, the composition of the secondary battery negative electrode material according to the example and the compositions of the secondary battery negative electrode materials according to the comparative examples 1 and 2 were measured by energy dispersive X-ray fluorescence analysis (EDX) and inductively-coupled plasma emission spectrometry (ICP).

Figure 2:
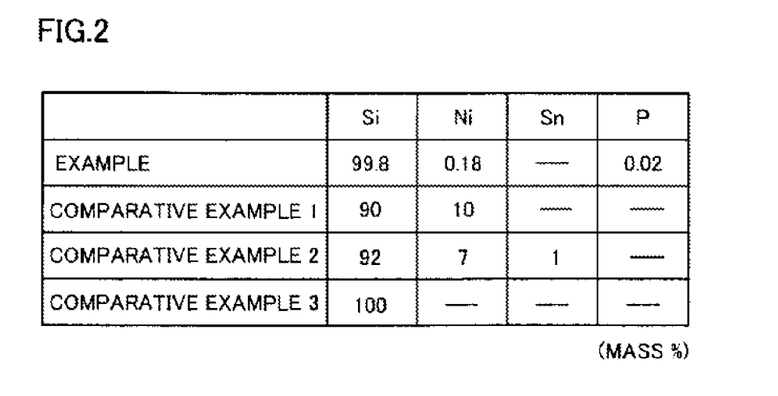
FIG. 2 is a diagram showing compositions of secondary battery negative electrode materials according to an example and comparative examples for confirming the effects of the present invention.

It was found from measurement results shown in FIG. 2 that in the secondary battery negative electrode material 100 corresponding to the example, a content percentage (0.18 mass % 0.02 mass %=0.2 mass %) obtained by adding up Ni and P was very small as compared with the content percentage (99.8 mass %) of Si. Furthermore, it was found that in the secondary battery negative electrode materials 100 corresponding to the example, the content percentage of P in the coating material 2 including the Ni—P alloy was 10 mass % (=0.02 mass %/(0.18 mass %+0.02 mass %)).

(Lattice Spacing Measurement)

The lattice spacing measurement is now described. In the lattice spacing measurement, an electronic diffraction image regarding the coating material 2 according to the aforementioned example was obtained by electronic diffraction using a transmission electron microscope. Then, lattice spacings in five lattice planes ((211), (400), (222), (402), and (460)) of the coating material 2 including the Ni—P alloy were measured.

Figure 3:
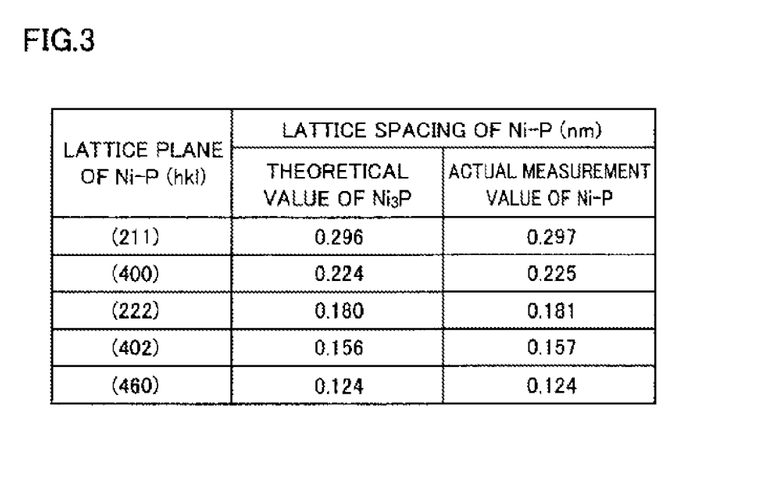
FIG. 3 is a diagram showing measurement results of lattice spacings in a coating material according to the example performed to confirm the effects of the present invention.

As actual measurement values of the lattice spacing measurement of the coating material 2 according to the example shown in FIG. 3, the lattice, spacing was 0.297 nm in the lattice plane (211), the lattice spacing was 0.225 nm in the lattice plane (400), the lattice spacing was 0.181 nm in the lattice plane (222), the lattice spacing was 0.157 nm in the lattice plane (402), and the lattice spacing was 0.124 nm in the lattice plane (460).

It was found that the lattice spacings in the five lattice planes ((211), (400), (222), (402), and (460)) of the coating material 2 according to the example shown in FIG. 3 were substantially equal to lattice spacings (theoretical values) in five lattice planes ((211), (400), (222), (402), and (460)) of $Ni_3P$, respectively. Thus, it was found that $Ni_3P$ (the content percentage of P of 15.2 mass %) was contained as the Ni—P alloy in the coating material 2.

From the results (see FIG. 2) of the aforementioned composition measurement, in the secondary battery negative electrode materials 100 according to the example, the content percentage of P in the coating material 2 including the Ni—P alloy is 10 mass % and is smaller than the content percentage (15.2 mass %) of P in $Ni_3P$. Therefore, it is conceivable that in the coating material 2 of the secondary battery negative electrode materials 100 according to the example, $Ni_3P$ and the Ni—P alloy having P whose content percentage is smaller than the content percentage of P in $Ni_3P$ exist as Ni—P alloy.

Second Embodiment

A secondary battery negative electrode 200 according to a second embodiment of the present invention is now described with reference to FIGS. 1 and 4. In this second embodiment, the secondary battery negative electrode 200 having an active material layer 202 formed on a current collector layer 201 by spraying the secondary battery negative electrode materials 100 according to the aforementioned first embodiment on the current collector layer 201 is described.

Figure 4:
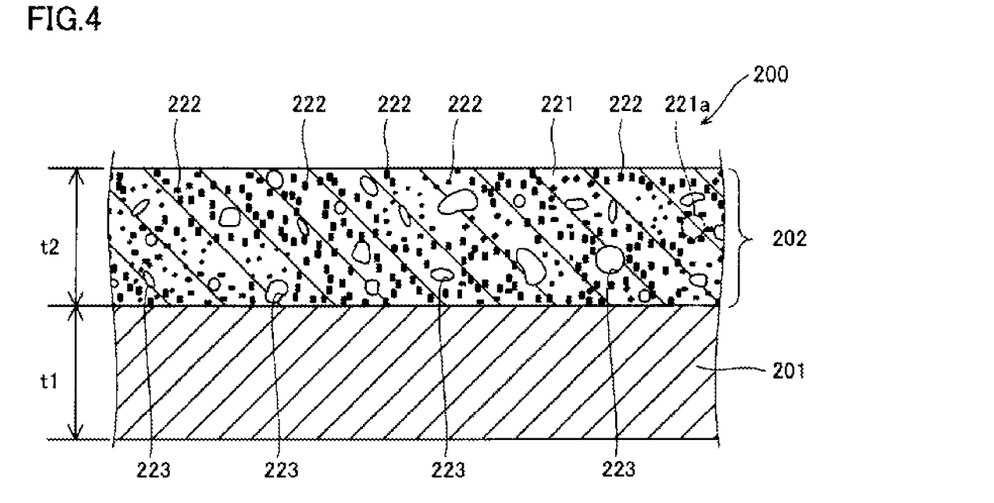
FIG. 4 is a sectional view showing the structure of a secondary battery negative electrode, according to a second embodiment of the present invention.

The secondary battery negative electrode 200 according to the second embodiment of the present invention includes the current collector layer 201 and the active material layer 202 formed on one surface of the current collector layer 201, as shown in FIG. 4. The secondary battery negative electrode, 200 is so configured that the thickness t1 of the current collector layer 201 is at least about 1 µm and not more than about 20 µm, and the thickness t2 of the active material layer 202 is at least about 1 µm and not more than about 20 µm. In addition, the current collector layer 201 is made of Cu foil.

According to the second embodiment, the active material layer 202 of the secondary battery negative electrode 200 includes a Si layer 221 formed in the form of laminae and coating portions 222 formed in the Si layer 221 to be distributed in an island-like, dot-like, or net-like pattern. These coating portions 222 are arranged to be distributed in the island-like, dot-like, or net-like pattern over a substantially entire interior portion of the Si layer 221, and a part of the coating portions 222 is arranged to surround an arbitrary region 221a of the Si layer 221. The Si layer 221 is an example, of the "Si portion" in the present invention.

Si of the Si layer 221 reacts with an electron transmitted from the current collector layer 201 and a Li cation included in an electrolyte of a lithium ion secondary battery during charging of the lithium ion secondary battery, whereby $Li_{4.4}Si$ alloy is formed with a composition in which a percentage of Li is highest. On the other hand, the $Li_{4.4}Si$ alloy formed in the Si layer 221 during charging (during lithium insertion) is separated into an electron, a Li cation, and Si during discharging of the lithium ion secondary battery (during lithium desorption), whereby the generated electron is supplied to the current collector layer 201. In other words, in the Si layer 221, the $Li_{4.4}Si$ alloy is formed during charging of the lithium ion secondary battery whereas the $Li_{4.4}Si$ alloy is separated during discharging of the lithium ion secondary battery, and hence the volume of the Si layer 221 is changed during charging and discharging of the lithium ion secondary battery. Due to this volume change, stress is generated in the secondary battery negative electrode 200.

According to the second embodiment, the coating portions 222 partially include Ni—P alloy having a crystal structure of $Ni_3P$ (the content percentage of P is 15.2 mass %). Furthermore, the composition of the entire coating portions 222 includes P of at least about 0.5 mass % and not more than about 50 mass % and Ni. It is preferable that the entire coating portions 222 include P of at least about 5 mass % and not more than about 16 mass % and Ni since a proportion of $Ni_3P$ in the coating portions 222 can be increased.

In the Si layer 221, a plurality of voids 223 are formed to be decentrally distributed. These voids 223 are formed in the active material layer 202 at a level of at least about 2, volume % and not more than about 70 volume %. At least a part of the voids 223 is coupled to another void and is formed to be connected to an external portion (a surface of the Si layer 221 opposite to the current collector layer 201 (a surface of the Si layer 221 in contact with the electrolyte)). Thus, the electrolyte (Li cation) of the lithium ion secondary battery can enter the voids 223, and hence the electrolyte of the lithium ion secondary battery can reach Si located in the active material layer 202 (Si layer 221).

Figure 5:
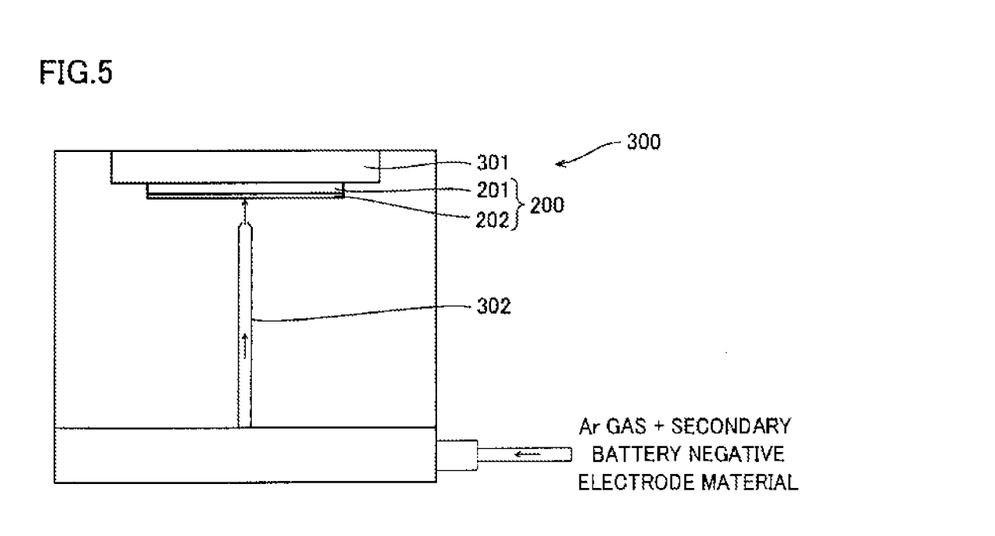
FIG. 5 is a diagram for illustrating a process for manufacturing the secondary battery negative electrode according to the second embodiment of the present invention.

A process for manufacturing the secondary battery negative electrode 200 according to the second embodiment of the present invention is now described with reference to FIGS. 1, 4, and 5.

First, the plurality of secondary battery negative electrode materials 100 according to the aforementioned first embodiment shown in FIG. 1 are prepared.

Then, the plurality of secondary battery negative electrode materials 100 are sprayed on one surface of the current collector layer 201 made of Cu foil by an aerosol deposition method. Specifically, the current collector layer 201 having the thickness t1 of at least about 1 µm and not more than about 20 µm is arranged on the lower surface of a stage 301 in a pressure-reduced chamber 300, as shown in FIG. 5. Then, a nozzle 302 having an inner diameter of about 0.8 mm is arranged at an interval of about 10 mm on one surface side of the current collector layer 201. Then, the plurality of secondary battery negative electrode materials 100 are sprayed together with Ar gas having a gas pressure of about $6.0 \times 10^5$ Pa on one surface of the current collector layer 201 through the nozzle 302 under room temperature. Thus, the active material layer 202 having the thickness t2 of at least about 1 μm and not more than about 20 μm is formed on one surface of the current collector layer 201. Consequently, the secondary battery negative electrode 200 shown in FIG. 4 is formed.

At this time, the secondary battery negative electrode materials 100 are sprayed on the current collector layer 201 or the Si particles 1 (see FIG. 1) already arranged on the current collector layer 201, whereby the Si particles 1 are bonded to each other. Thus, whereas substantially no particulate Si particle 1 exists, the Si particles 1 are bonded to each other so that the Si layer 221 is formed. At this time, the voids 223 are formed in the Si layer 221 to be distributed at the level of at least about 20 volume % and not more than about 70 volume % with respect to the active material layer 202.

Furthermore, the secondary battery negative electrode materials 100 are sprayed on the current collector layer 201 or the Si particles 1 already arranged on the current collector layer 201, whereby the coating material 2 (see FIG. 1) is arranged to be dispersed over the substantially entire interior portion of the Si layer 221. At this time, the coating material 2 formed on a surface 1a see FIG. 1) of the same Si particle 1 may partially maintain a position formed on the surface of the Si particle 1 regardless of the bonding of the Si particles 1 to each other. In this case, a part of the coating portions 222 formed to surround the arbitrary region 221a (a region along the shape of the Si particle 1).

According to the second embodiment, as hereinabove described, the active material layer 202 includes the Si layer 21 formed in the form of laminae and the coating portions 222 formed in the Si layer 221 to be distributed in the island-like, dot-like, or net-like pattern, whereby the charge-discharge cycle life of the secondary battery negative electrode 200 can be further increased as compared with a case where the coating portions 222 include only Ni. Furthermore, the active material layer 202 includes the Si layer 221 and the coating portions 222 containing Ni and P, formed in the Si layer 221 to be distributed in the island-like, dot-like, or net-like pattern, whereby the active material layer 202 can withstand stress generated in the secondary battery negative electrode 200 during charging and discharging, and disruption of the active material layer 202 can be suppressed. In addition, insertion and desorption of the electrolyte (Li cation) of the lithium ion secondary battery is facilitated, and hence the charge-discharge capacity of the secondary battery negative electrode, 200 can be improved.

According to the second embodiment, as hereinabove described, the voids 223 are formed at the level of at least 20 volume % of the active material layer 202, whereby the voids 223 sufficient to reduce the stress can be obtained, and hence the stress generated in the secondary battery negative electrode 200 during charging and discharging can be reduced. Furthermore, the voids 223 are formed at the level of not more than 70 volume of the active material layer 202, whereby excessive reduction in the volume of the Si layer 221 to react with the electrolyte (Li cation) of the lithium ion secondary battery resulting from excessive increase in a proportion of the voids 223 can be suppressed. Thus, reduction in the charge-discharge capacity of the secondary battery negative electrode 200 can be suppressed.

According to the second embodiment, as hereinabove described, the thickness t2 of the active material layer 202 is at least 1 μm, whereby reduction in the charge-discharge capacity of the secondary battery negative electrode 200 can be suppressed. Furthermore, the thickness t2 of the active material layer 202 is not more than 20 μm, whereby difficulty in reaction of Si in the vicinity of the current collector layer 201 with the electrolyte (Li cation) of the lithium or secondary battery can be suppressed, and hence reduction in the charge-discharge rate of the secondary battery negative electrode 200 due to difficulty in reaction of Si in the vicinity of the current collector layer 201 with the electrolyte of the lithium ion secondary battery can be suppressed.

According to the second embodiment, as hereinabove described, the composition of the entire coating portions is configured to include P of at least about 0.5 mass % and not more than about 50 mass % and Ni, whereby the crystal structure of Ni including P includes $Ni_3P$ so that the charge-discharge cycle life can be increased.

According to the second embodiment, as hereinabove described, the powdery secondary battery negative electrode materials 100 are sprayed on one surface of the current collector layer 201 made of Cu foil by the aerosol deposition method, whereby the active material layer 202 can be easily formed to include the Si layer 221 and the coating portions 222 containing Ni and P, formed in the Si layer 221 to be distributed in the island-like, dot-like, or net-like pattern.

Example 2

Charge-discharge capacity measurement and elastic coefficient measurement performed to confirm the effects of the secondary battery negative electrode 200 according to the aforementioned second embodiment are now described with reference to FIGS. 4 to 10.

(Charge-Discharge Capacity Measurement)

First, discharge (lithium desorption) capacity measurement is described. In this charge-discharge capacity measurement, the secondary battery negative electrode materials according to the aforementioned example and comparative examples 1 to 3 were sprayed on one surface of the current collector layer made of Cu foil having a thickness of 20 μm by the aerosol deposition method, whereby the active material layer was formed on one surface of the current collector layer. Specifically, the current collector layer 201 having the thickness of 20 μm was arranged on the over surface of the stage 301 in the pressure-reduced chamber 300, as shown in FIG. 5. Then, the secondary battery negative electrode materials according to the example and the comparative examples 1 to 3 were sprayed together with Ar gas having a gas pressure of $6.0 \times 10^5$ Pa on one surface of the current collector layer 201 through the nozzle 302 under room temperature. Thus, secondary battery negative electrodes corresponding to the example and the comparative examples 1 to 3, including the current collector layer and the active material layer formed on one surface of the current collector layer were prepared.

Figure 6:
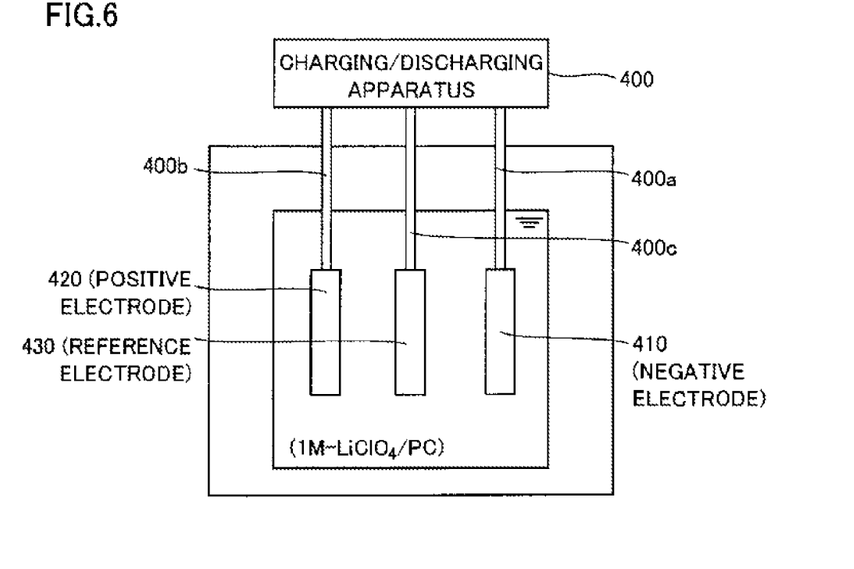
FIG. 6 is a schematic view for illustrating charge-discharge capacity measurement of the example and the comparative examples performed to confirm the effects of the present invention.

Then, the secondary battery negative electrodes 410 corresponding to the example and the comparative examples 1 to 3 were mounted on the tip of a negative electrode-side terminal 400a of a charging/discharging apparatus 400, as shown in FIG. 6. In addition, a positive electrode 420 made of Li foil having a thickness of 1 mm and a reference electrode 430 made of Li foil having a thickness of 1 mm were mounted on a positive electrode-side terminal 400b and a reference electrode-side terminal 400c of the charging/discharging apparatus 400, respectively. As an electrolyte, a solution obtained by dissolving $LiClO_4$ in a solvent of propylene carbonate (PC) so that the concentration is 1 M was employed. Thereafter, the negative electrode-side terminal 400a, the positive electrode-side terminal 400*b*, and the reference electrode-side terminal 400*c* were arranged in the electrolyte.

Thereafter, the charging/discharging apparatus 400 was set to apply a constant current of 0.05 mA between the negative electrode-side terminal 400*a* and the positive electrode-side terminal 400*b* under a temperature condition of 30° C. Furthermore, the charging/discharging apparatus 400 was set to stop charging when a cutoff potential of Li/Li$^+$ reached 0.005 V during charging. Then, a capacity (charge capacity) during this charging was measured. Thereafter, discharging was performed from a charging state. The charging/discharging apparatus 400 was set to stop discharging when a cutoff potential of Li/Li$^+$ reached 3.4 V during discharging. Then, a capacity (discharge capacity) during this discharging was measured. Thereafter, charging was performed from a discharging state. A cycle (charge-discharge cycle) of this charging and discharging was repeated a thousand times.

Figure 7:
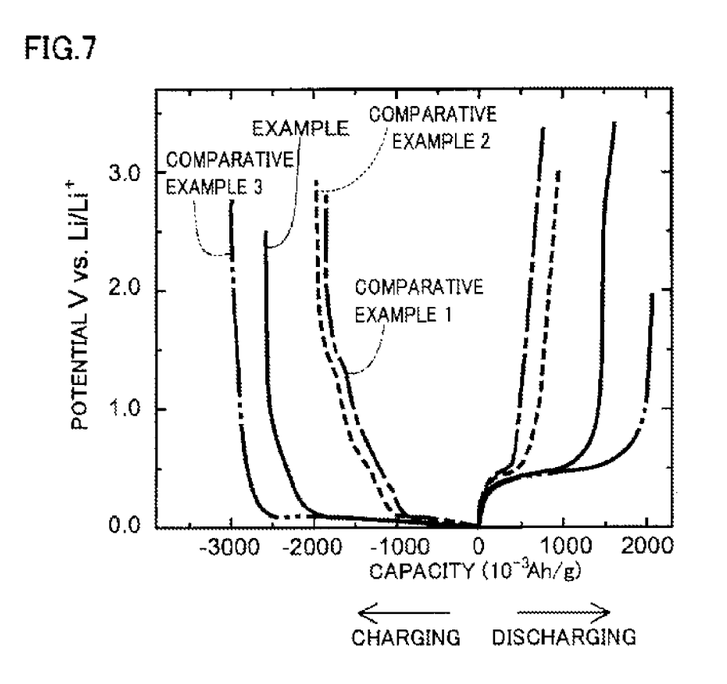
FIG. 7 is a diagram showing the first charge-discharge curves of the example and the comparative examples performed to confirm the effects of the present invention.

As experimental results of the charge-discharge capacity measurement shown in FIG. 7, it was found that the capacity of the secondary battery negative electrode according to the example Ni—P coated Si) was smaller than that of the secondary battery negative electrode according to the comparative example 3 (uncoated Si) during the first charging and discharging. This is considered to be because in the secondary battery negative electrode according to the example, the coating portions including the Ni—P alloy was located in the Si layer so that Si capable of coming into contact with the Li cation of the electrolyte was reduced.

On the other hand, it was found that the capacity of the secondary battery negative electrode according to the example (Ni—P coated Si) was larger than that of the secondary battery negative electrode according to the comparative example 1 (Ni coated Si) during the first charging and discharging. In addition, it was found that the capacity of the secondary battery negative electrode according to the example was larger than that of the secondary battery negative electrode according to the comparative example 2 (Ni—Sn coated Si) during the first charging and discharging. This is considered to be because Ni—Sn alloy was phase separated so that the secondary battery negative electrode according to the comparative example 2 partially became non-functional.

Figure 8:
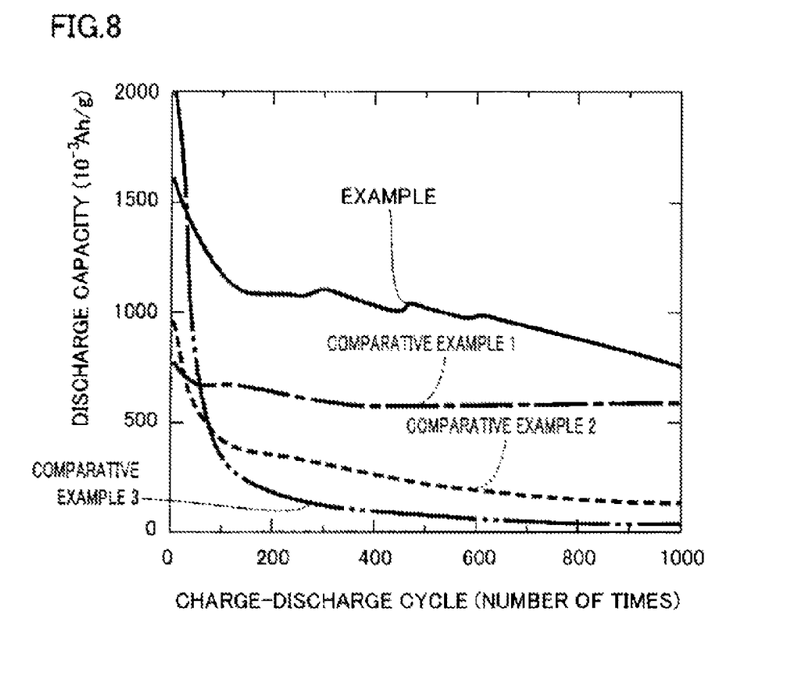
FIG. 8 is a diagram showing changes of discharge (lithium desorption) capacities with respect to the charge-discharge cycles of the example and the comparative examples performed to confirm the effects of the present invention.
Figure 9:
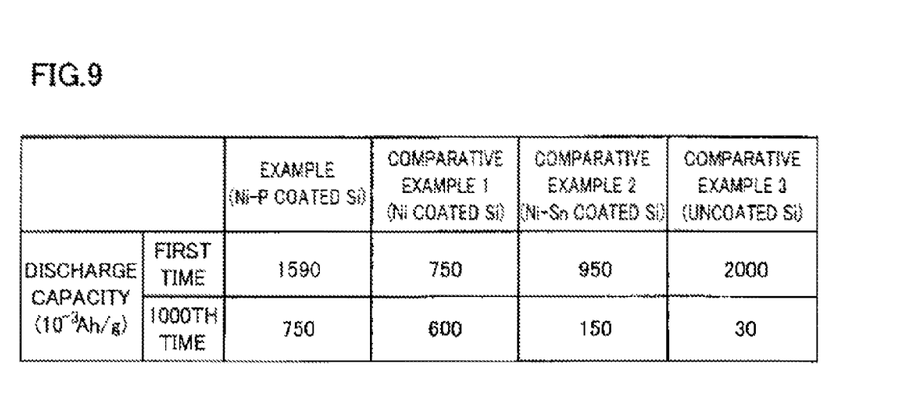
FIG. 9 is a diagram showing the first and 1000th discharge (lithium desorption) capacities of the example and the comparative examples performed to confirm the effects of the present invention.

Furthermore, it was found from experimental results of the charge-discharge capacity measurement shown in FIG. 8 that the 1000th discharge capacity of the secondary battery negative electrode according to the example (Ni—P coated. Si) was larger than those of the secondary battery negative electrodes according to the comparative example 1 (Ni coated Si), the comparative example 2 (Ni—Sn coated Si), and the comparative example 3 (uncoated Si). Specifically, the discharge capacity of the secondary battery negative electrode according to the example was $750 \times 10^{-3}$ Ah/g, as shown in FIG. 9. On the other hand, the discharge capacity of the secondary battery negative electrode according to the comparative example 1 was $600 \times 10^{-3}$ Ah/g. In addition, the discharge capacity of the secondary battery negative electrode according to the comparative example 2 was $150 \times 10^{-3}$ Ah/g. The discharge capacity of the secondary battery negative electrode according to the comparative example 3 was $30 \times 10^{-3}$ Ah/g. From this, it was found that the secondary battery negative electrode, according to the example had the very large discharge capacity of $750 \times 10^{-3}$ Ah/g even when the charge-discharge cycle was repeated a thousand times. In other words, it was found that the structure of forming the coating portions including the Ni—P alloy in Si as the active material layer as in the secondary battery negative electrode according to the example, was employed, whereby the discharge capacity could be further improved while the charge-discharge, cycle life was increased.

As described above, it was found that in the secondary battery negative electrode according to the example (Ni—P coated Si) corresponding to the aforementioned second embodiment, the discharge capacity could be further improved while the charge-discharge cycle life was increased.

In addition, it was found that the reduction rates of the discharge capacities of the secondary battery negative electrodes according to the example, (Ni—P coated Si) and the comparative example 1 (Ni coated Si) were smaller than those of the secondary battery negative electrodes according to the comparative example 2 (Ni—Sn coated Si) and the comparative example 3 (uncoated. Si) until the 100th charge-discharge cycle. This is because in the secondary battery negative electrode, according to the comparative example 2 (Ni—Sn coated Sn liberated by phase-separating the Ni—Sn alloy reacted with the Li cation of the electrolyte to be alloyed during charging and the alloy was degraded during discharging. Thus, it is conceivable that the Ni—Sn alloy layer having a function of bonding together the Si particles, a stress-reduction function, and a conductive function could not serve that role, so that the secondary battery negative electrode partially became non-functional early. Furthermore, in the secondary battery negative electrode according to the comparative example 3 (uncoated Si), it is conceivable that the Si layer was disrupted by stress generated in the secondary battery negative electrode during charging and discharging, so that the secondary battery negative electrode partially became non-functional early.

On the other hand, in the secondary battery negative electrode according to the example (Ni—P coated Si), it is conceivable that the coating portion including the Ni—P alloy containing Ni$_3$P helped the Si layer to be capable of withstanding stress generated in the secondary battery negative electrode during charging and discharging and disruption of the Si layer could be suppressed, so that the secondary battery negative electrode could be inhibited from partially becoming non-functional. Also in the secondary battery negative electrode according to the comparative example 1 (Ni coated Si), it is conceivable that the coating portion containing Ni helped the secondary battery negative electrode, to be capable of withstanding stress generated in the secondary battery negative electrode, during charging and discharging and disruption of the secondary battery negative electrode could be suppressed, so that the secondary battery negative electrode could be inhibited from partially becoming non-functional.

(Elastic Coefficient Measurement)

The elastic coefficient measurement is now described. In this elastic coefficient measurement, the elastic coefficients of the active material layers (part 202 in FIG. 4) of the secondary battery negative electrodes according to the aforementioned example and comparative examples 1 to 3 were measured by an indenter hardness measurement method. Specifically, an indenter (not shown) made of diamond having a tip angle of 115 degrees was pressed with pressure increasing by 0.29 mN every second onto the secondary battery negative electrodes according to the example and the comparative examples 1 to 3 from the sides closer to the active material layers. When the pressure reached 4.9 mN, the pressure was maintained for five seconds, and thereafter the pressure applied to the secondary battery negative electrodes according to the example and the comparative examples 1 to 3 was gradually released to decrease by 0.29 mN every second. The amounts of change in the strains of the secondary battery negative electrodes in a sequence of operations were measured with an unshown hardness meter. Elastic coefficients were measured from the amounts of change in the strains with respect to the pressure.

Figure 10:
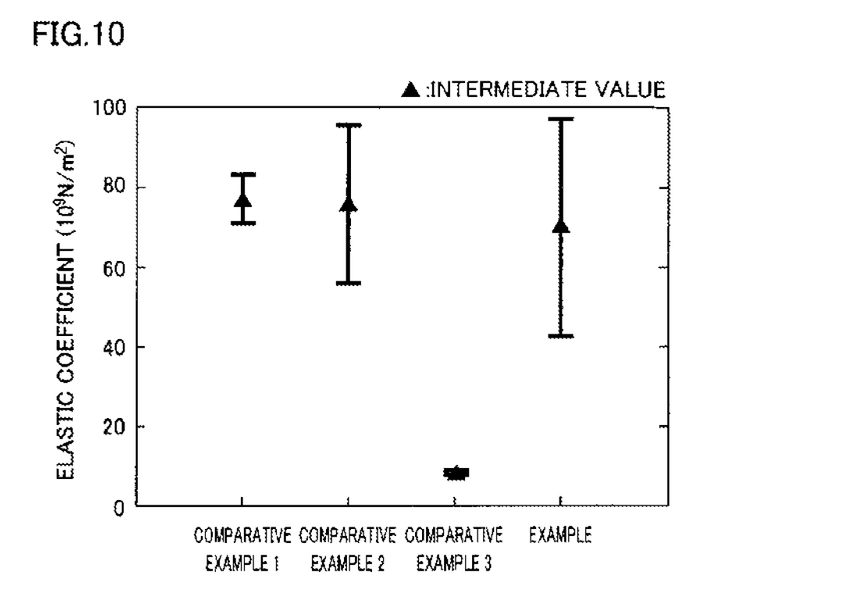
FIG. 10 is a diagram showing the elastic coefficients of secondary battery negative electrodes according to the example and the comparative examples performed to confirm the effects of the present invention.

As experimental results of the elastic coefficient measurement shown in FIG. 10, it was found that the secondary battery negative electrodes according to the example (Ni—P coated Si), the comparative example 1 (Ni-coated Si), and the comparative example 2 (Ni—Sn coated Si) had elastic coefficients eight or more times larger than that of the secondary battery negative electrode according to the comparative example 3 (uncoated Si), that is, durability against expansion and contraction of Si was larger. Thus, in the secondary battery negative electrodes having the active material layers including the Ni—P alloy, Ni, or the Ni—Sn alloy in addition Si, it is conceivable that bonding power between Si crystal grains is increased as compared with a case of the secondary battery negative, electrode having the active material layer including only Si, so that the active material layers withstand stress generated in the negative electrodes and disruption of the active material layers is suppressed.

Furthermore, it was found that the secondary battery negative electrode according to the example (Ni—P coated Si) having a content percentage (see FIG. 4) of Si larger (a content percentage of the Ni—P alloy smaller) than those of the secondary battery negative electrodes according to the comparative example 1 (Ni coated Si) and the comparative, example 2 (Ni—Sn coated Si) had an elastic coefficient nearly equal to those of the secondary battery negative electrodes according to the comparative example 1 and the comparative example 2. Thus, it is conceivable that even if the Ni—P alloy containing $Ni_3P$ is smaller in amount as compared with Ni and the Ni—Sn alloy, the bonding power between the Si crystal grains is increased, so that the secondary battery negative electrode withstands the stress generated in the negative electrode and disruption of the secondary battery negative electrode is suppressed. This is considered to be because the mechanical strength of Ni can be increased by adding P to form $Ni_3P$. Consequently, when the coating portion is the Ni—P alloy, the coating portion necessary to reduce the stress can be reduced. Therefore, the coating portion is reduced, whereby an area of an exposed surface of Si (an area of a portion of Si in contact with the electrolyte) can be increased. Thus, it is conceivable that the charge-discharge, capacity of the secondary battery negative electrode can be further improved.

Third Embodiment

A third embodiment of the present invention is now described with reference to FIGS. 1, 11, and 12. A case where active material layers 502 include a plurality of Si particles 1 and a coating material 2 by forming the active material layers 502 on surfaces of a current collector layer 201 by a coating method in a secondary battery negative electrode 500 according to this third embodiment is described dissimilarly to the aforementioned second embodiment.

Figure 11:
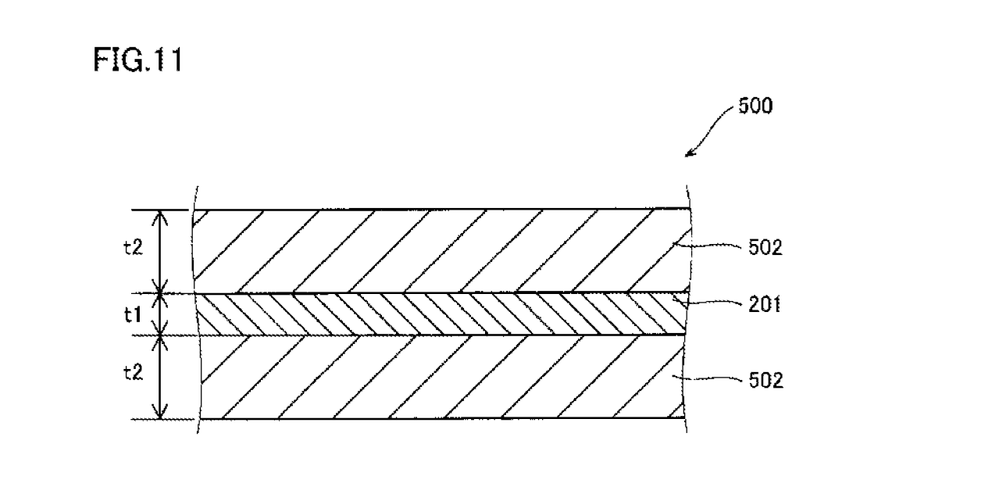
FIG. 11 is a sectional view showing the structure, of a secondary battery negative electrode according to a third embodiment of the present invention.

The secondary battery negative, electrode 500 according to the third embodiment of the present invention includes the current collector layer 201 and the active material layers 502 formed on both surfaces of the current collector layer 201, as shown in FIG. 11. The thickness t1 of the current collector layer 201 is at least about 1 μm and not more than about 20 μm, and the thickness t2 of each of the active material layers 502 is at least about 1 μm and not more than about 20 μm.

Figure 12:
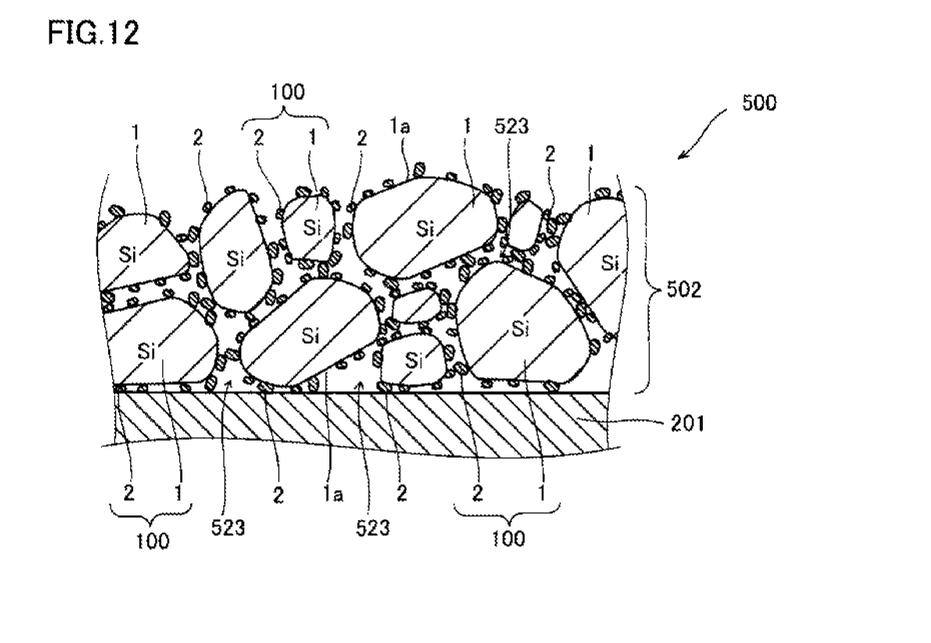
FIG. 12 is an enlarged sectional view showing the structure of the secondary battery negative electrode according to the third embodiment of the present invention.

According to the third embodiment, the active material layers 502 of the secondary battery negative electrode 500 are so formed on the surfaces of the current collector layer 201 by the coating method described later that a plurality of secondary battery negative electrode materials 100 shown in FIG. 1 are stacked in a state of maintaining the particle shapes of the Si particles 1, as shown in FIG. 12. Thus, the active material layers 502 include the plurality of Si particles 1 and the coating material 2 partially covering a surface 1a of each of the plurality of Si particles 1 and arranged to be distributed in an island-like, dot-like, or net-like pattern. The Si particles 1 are examples of the "Si portion" in the present invention, and the coating material 2 is an example of the "coating portion" in the present invention.

The plurality of secondary battery negative electrode materials 100 are stacked in the state of maintaining the particle shapes of the Si particles 1, whereby a plurality of voids 523 are formed between the Si particles 1. These voids 523 are formed in the active material layers 502 at a level of at least about 20 volume % and not more than about 70 volume %. At least a part of the voids 523 is coupled to another void and is connected to an external portion (surfaces of the active material layers 502 opposite to the current collector layer 201 (surfaces of the active material layers 502 in contact with an electrolyte)). The remaining structure of the secondary battery negative electrode 500 according to the third embodiment is similar to that of the secondary battery negative electrode 200 according to the aforementioned second embodiment.

A process for manufacturing the secondary battery negative electrode 500 according to the third embodiment of the present invention by the coating method is now described with reference to FIGS. 1, 11, and 12.

First, the plurality of secondary battery negative electrode materials 100 according to the aforementioned first embodiment shown in FIG. 1 are prepared.

Then, the plurality of secondary battery negative electrode materials 100 are mixed with a solvent and a binder to prepare a coating liquid. Thereafter, the coating liquid is applied to both surfaces of the current collector layer 201 made of Cu foil. Then, the current collector layer 201 applied with the coating liquid is dried and thereafter is applied with pressure, whereby the secondary battery negative electrode 500 including the current collector layer 201 and the active material layers 502 formed on both surfaces of the current collector layer 201 shown in FIG. 11 is formed.

At this time, the secondary battery negative electrode materials 100 are applied to both surfaces of the current collector layer 201, whereby the Si particles 1 are stacked in a state where the particle shapes thereof are maintained to some extent, as shown in FIG. 12. Thus, the voids 523 are formed between the Si particles 1 to be distributed at the level of at least about 20 volume % and not more than about 70 volume % with respect to each of the active material layers 502. In the manufacturing process through the coating method according to the third embodiment, a volume proportion of the voids in the active material layers tends to be increased as compared with that in the manufacturing process through the aerosol deposition method according to the aforementioned second embodiment.

Furthermore, the secondary battery negative electrode materials 100 are applied to the current collector layer 201, whereby a state where the coating material 2 partially covers the surfaces 1a of the Si particles 1 and is arranged to be distributed in the island-like, dot-like, or net-like pattern is maintained.

According to the third embodiment, as hereinabove described, the active material layers 503 are configured to include the plurality of Si particles 1 and the coating material 2 containing Ni and P, formed to be distributed in the island-like, dot-like, or net-like pattern so as to partially cover the surfaces 1a of the Si particles 1, whereby the charge-discharge capacity of the secondary battery negative electrode 500 can be further improved as compared with a case where the coating material 2 includes only Ni. Furthermore, the active material layers can withstand stress generated in the secondary battery negative electrode 500 during charging and discharging, and disruption of the active material layers can be suppressed. In addition, insertion and desorption of the electrolyte (Li cation) of a lithium ion secondary battery is facilitated, and hence the charge-discharge capacity of the secondary battery negative electrode 500 can be improved.

According to the third embodiment, as hereinabove described, the secondary battery negative electrode 500 including the current collector layer 201 and the active material layers 502 formed on both surfaces of the current collector layer 201 is formed by applying the coating liquid containing the plurality of secondary battery negative electrode materials 100 to both surfaces of the current collector layer 201 made of Cu foil, whereby the active material layers 502 can be easily formed to include the plurality of Si particles 1 and the coating material 2 containing Ni and F, formed to be distributed in the island-like, dot-like, or net-like pattern so as to partially cover the surfaces 1a of the Si particles 1. The remaining effects of the secondary battery negative electrode 500 according to the third embodiment are similar to those of the secondary battery negative electrode 200 according to the aforementioned second embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the example of forming the coating material 2 on the surface 1a of each of the plurality of Si particles 1 to partially cover the surface 1a by the electroless deposition (ELD) method, which is a type of plate processing, and to be distributed in the island-like, dot-like, or net-like pattern has been shown in the aforementioned first embodiment, the present invention is not restricted to this. For example, the coating material 2 may be formed on the surface 1a of each of the plurality of Si particles 1 to partially cover the surface 1a by an electrolytic plating method, a sputtering method, a vapor deposition method, or the like and to be distributed in the island-like, dot-like, or net-like pattern.

While she example in which the coating material 2 (coating portions 222) partially includes the Ni—P alloy having the crystal structure of $Ni_3P$ has been shown in each of the aforementioned first to third embodiments, the present invention is not restricted to this. According to the present invention, the coating material 2 (coating portions 222) may be configured to include Ni—P alloy not containing $Ni_3P$ so far as the coating material 2 (coating portions 222) includes Ni—P alloy contributing increase in bonding power between Si crystal grains.

While the example in which the current collector layer 201 is made of Cu foil has been shown in each of the aforementioned second and third embodiments, the present invention is not restricted to this. According to the present invention, the current collector layer 201 may be made of a metal material such as Ni or Cu alloy other than Cu foil. In this case, a metal material having a smaller electric resistance is preferable.

While the example of forming a part of the coating portions 222 to surround the arbitrary region 221a (the region along the shape of the Si particle 1) has been shown in the aforementioned second embodiment, the present invention is not restricted to this. According to the present invention, all of the coating portions 222 may be arranged over the substantially entire interior portion of the Si layer 221.

While the example of forming the coating material 2 on the surface 1a of each of the plurality of Si particles 1 to partially cover the surface 1a and be distributed in the island-like, dot-like, or net-like pattern has been shown in the aforementioned first embodiment, the present invention is not restricted to this. According to the present invention, the coating material 2 may be formed to totally cover the surface 1a, or the coating material 2 may be formed to mostly cover the surface 1a and may be so formed that an uncoated portion is distributed in a hole-like pattern.

While the example of forming the coating portions 222 in the Si layer 221 to be distributed in the island-like, dot-like, or net-like pattern has been shown in to aforementioned second embodiment, the present invention is not restricted to this. According to the present invention, the coating portions 222 may not be distributed in the island-like, dot-like, or net-like pattern, so far as the same are formed in the Si layer 221. For example, the coating portions 222 may be formed substantially entirely in the Si layer 221.

What is claimed is:

1. A secondary battery negative electrode material constituting an active material layer formed on a current collector layer of a secondary battery negative electrode, comprising:
    a Si particle; and
    a coating material containing Ni and P, formed to cover a surface of the Si particle,
    wherein at least a part of the coating material has a crystal structure of $Ni_3P$.

2. The secondary battery negative electrode material according to claim 1, wherein
    the coating material is formed to be distributed in an island-like, dot-like, or net-like pattern so as to partially cover the surface of the Si particle.

3. The secondary battery negative electrode material according to claim 1, wherein
    the coating material covers at least 1% and not more than 25% of the surface of the Si particle.

4. The secondary battery negative electrode material according to claim 1, wherein
    the coating material includes P of at least 0.5 mass % and not more than 50 mass % and Ni.

5. The secondary battery negative electrode material according to claim 4, wherein
    the coating material includes P of at least 5 mass % and not more than 16 mass % and Ni.

6. A secondary battery negative electrode comprising:
    a current collector layer; and
    an active material layer formed on a surface of the current collector layer, wherein the active material layer includes:
    a Si portion, and
    a coating portion containing Ni and P, formed on the Si portion or between the Si portions;
    wherein at least a part of the coating material has a crystal structure of $Ni_3P$.

7. The secondary battery negative electrode according to claim 6, wherein
    the coating portion is formed to be distributed in an island-like, dot-like, or net-like pattern on the Si portion or between the Si portions.

8. The secondary battery negative electrode according to claim 6, wherein a void is formed on the Si portion of the active material layer or between the Si portions of the active material layer.

9. The secondary battery negative electrode according to claim 8, wherein
the void is formed at a level of at least 20 volume % and not more than 70 volume % of the active material layer.

10. The secondary battery negative electrode according to claim 6, wherein
a thickness of the active material layer is at least 1 μm and not more than 20 μm.

11. The secondary battery negative electrode according to claim 6, wherein
the coating portion of the active material layer includes P of at least 0.5 mass % and not more than 50 mass % and Ni.

12. The secondary battery negative electrode according to claim 6, wherein
the active material layer includes a Si layer and the coating portion containing Ni and P, formed to be distributed in the island-like, dot-like, or net-like pattern in the Si layer.

13. The secondary battery negative electrode according to claim 6, wherein
the active material layer includes a plurality of Si particles and a coating material containing Ni and P, formed to be distributed in the island-like, dot-like, or net-like pattern so as to partially cover surfaces of the Si particles.

14. A method for manufacturing a secondary battery negative electrode material of claim 1, comprising steps of:
preparing a Si particle; and
distributing a coating material containing Ni and P to cover a surface of the Si particle,
wherein the step of distributing the coating material includes a step of distributing the coating material such that at least a part of the coating material containing Ni and P has a crystal structure of $Ni_3P$.

15. The method for manufacturing a secondary battery negative electrode material according to claim 14, wherein
the step of distributing the coating material includes a step of distributing the coating material in an island-like, dot-like, or net-like pattern to partially cover the surface of the Si particle.

16. The method for manufacturing a secondary battery negative electrode material according to claim 14, wherein
the step of distributing the coating material includes a step of distributing the coating material by performing plate processing.

17. The method for manufacturing a secondary battery negative electrode material according to claim 14, wherein
the step of distributing the coating material includes a step of distributing the coating material so as to cover at least 1% and not more than 25% of the surface of the Si particle.

18. The method for manufacturing a secondary battery negative electrode material according to claim 14, wherein
the coating material includes P of at least 0.5 mass % and not more than 50 mass % and Ni.

19. A method for manufacturing a secondary battery negative electrode of claim 6, comprising steps of:
preparing a Si particle;
forming a powdery secondary battery negative electrode material by distributing a coating material containing Ni and P to cover a surface of the Si particle; and
forming an active material layer including a Si portion and a coating portion containing Ni and P on the Si portion or between the Si portions by arranging the powdery secondary battery negative electrode material on a surface of a current collector by a prescribed method,
the step of forming the active material layer includes a step of distributing the active material layer such that at least a part of the active material layer containing Ni and P has a crystal structure of $Ni_3P$.

20. The method for manufacturing a secondary battery negative electrode according to claim 19, wherein
the step of forming the powdery secondary battery negative electrode material includes a step of distributing the coating material in an island-like, dot-like, or net-like pattern to partially cover the surface of the Si particle.

21. The method for manufacturing a secondary battery negative electrode according to claim 20, wherein
the step of forming the active material layer includes a step of forming the active material layer including the Si portion and the coating portion distributed in the island-like, dot-like, or net-like pattern on the Si portion or between the Si portions by arranging the powdery secondary battery negative electrode material on the surface of the current collector.

22. The method for manufacturing a secondary battery negative electrode according to claim 19, wherein
the step of forming the active material layer includes a step of forming the active material layer by spraying the powdery secondary battery negative electrode material on the surface of the current collector by an aerosol deposition method.

23. The method for manufacturing a secondary battery negative electrode according to claim 19, wherein
the step of forming the active material layer includes a step of forming the active material layer by applying a coating liquid containing the powdery secondary battery negative electrode material onto the surface of the current collector.

24. The method for manufacturing a secondary battery negative electrode according to claim 19, wherein
the step of forming the active material layer includes a step of forming the active material layer such that a void is formed on the Si portion of the active material layer or between the Si portions of the active material layer.

25. The method for manufacturing a secondary battery negative electrode according to claim 19, wherein
the step of forming the secondary battery negative electrode material includes a step of forming the secondary battery negative electrode material by distributing the coating material such that the coating material includes P of at least 0.5 mass % and not more than 50 mass % and Ni.

* * * * *